(12) United States Patent
Zhu et al.

(10) Patent No.: US 7,941,557 B2
(45) Date of Patent: May 10, 2011

(54) DYNAMICAL ROUTING FOR TEXT MESSAGING

(75) Inventors: Tong Zhu, Fremont, CA (US); Kenneth Tsz Ho, Belmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 293 days.

(21) Appl. No.: 11/946,763

(22) Filed: Nov. 28, 2007

(65) Prior Publication Data
US 2009/0138563 A1 May 28, 2009

(51) Int. Cl.
G06F 15/173 (2006.01)
G06F 15/16 (2006.01)
H04W 4/00 (2009.01)

(52) U.S. Cl. ......... 709/238; 709/206; 709/239; 455/466

(58) Field of Classification Search .................. 709/206, 709/238, 241; 455/466
See application file for complete search history.

(56) References Cited

U.S. PATENT DOCUMENTS

| | | | |
|---|---|---|---|
| 6,512,926 B1 * | 1/2003 | Henry-Labordere | 455/445 |
| 6,567,419 B1 | 5/2003 | Yarlagadda | |
| 7,079,524 B2 * | 7/2006 | Bantukul et al. | 370/349 |
| 7,313,133 B2 | 12/2007 | Yarlagadda | |
| 2002/0085027 A1 * | 7/2002 | Kim | 345/738 |
| 2004/0032860 A1 | 2/2004 | Mundra et al. | |
| 2004/0142707 A1 * | 7/2004 | Midkiff et al. | 455/466 |
| 2004/0160979 A1 | 8/2004 | Pepin et al. | |
| 2005/0078660 A1 * | 4/2005 | Wood | 370/352 |
| 2006/0199597 A1 * | 9/2006 | Wright | 455/466 |

FOREIGN PATENT DOCUMENTS

| | | |
|---|---|---|
| EP | 1 161 038 A2 | 12/2001 |
| WO | 01/78430 A1 | 10/2001 |

* cited by examiner

Primary Examiner — Philip J Chea
(74) Attorney, Agent, or Firm — Frommer Lawrence & Haug LLP; Matthew M. Gaffney

(57) ABSTRACT

Routing text messages. A mobile message (MM) is received from an application program or other message source, and includes a destination identifier, such as a phone number. Based on the destination identifier, a routing server determines whether the MM is to be locally routed to a destination carrier, or forwarded to a remote server that provides access to the destination carrier. For local routing, the routing server determines a channel to the carrier based on predefined carrier information, the destination user information, and the carrier gateway dynamic information. The predefined carrier information indicates predicted availability or reliability of each of a plurality of channels to the carrier. The destination user information indicates availability of the destination user to receive messages, and includes a destination user criterion for determining one of the channels. The carrier gateway dynamic information indicates current and statistical traffic information for each of the channels.

18 Claims, 10 Drawing Sheets

DYNAMICAL ROUTING FOR TEXT MESSAGING

RELATED APPLICATIONS

This application is related to U.S. patent application Ser. No. 11/981,980, filed on Oct. 31, 2007, and titled "Application Interface For Global Mobile Message Delivery;" is related to U.S. patent application Ser. No. 11/843,167, filed on Aug. 22, 2007, and titled "Retrieving Mobile User Context Information Using Tokenized Virtual Dictionaries;" and is related to U.S. patent application Ser. No. 11/853,618, filed on Sep. 11, 2007, and titled "SMS Short Code Allocation;" the entire contents of all of which are hereby incorporated by reference.

FIELD OF ART

The invention relates generally to mobile communications, and more particularly but not exclusively to managing dynamic routing of data across disparate network carriers and applications.

BACKGROUND

The use of mobile technologies is steadily on the increase, for both business and personal uses. Mobile phones are a common site today, and many people own personal information management (PIM) devices, palmtop computers, and so forth, to manage their schedules, contacts, and to stay connected with friends, family, and work. Employees on the move often appreciate the value of staying connected with their business through their mobile devices.

With such a variety of mobile devices, one can receive email messages, Instant Messaging (IM) messages, and Short Message Service (SMS) text messages, in addition to regular voice calls. Recently, the use of SMS and other forms of text messaging has become very popular. Users often send text messages to each other via their mobile devices. However, application programs can also send text messages, such as alerts, to a user's mobile device. Conversely, a user may use a mobile device to send a search request, a request for more information, or other text message to an application program. The application program can return results in another text message to the user's mobile device.

Text messages, such as SMS messages, are typically sent over a Public Land Mobile Network (PLMN) or Public Telephone Switching Network (PTSN) via Gateway Mobile Switching Centers (GMSCs). For example, a content service may send news, financial information, advertisements, or other content as a text message to a user via a public network. Similarly, one user may send a text message to another user via a public network. Messages are often received from the public network by a Short Message Service Center (SMSC) associated with the individual destination carrier, which may be used to send messages to mobile devices associated with the individual destination carrier. Sending messages from content services to end users, or sending messages to users between carriers often incurs extra costs and added complexity. Moreover, when users are roaming outside of their own network (e.g., when traveling internationally), sending messages between carriers may also incur roaming fees.

Text messages are typically routed through a public network, based on a relatively static set of criteria, such as a predefined quality of service level, a lowest cost path, or statistical analysis of prior traffic. A single carrier can also adjust message routing within its own network for individual events such as maintenance or special promotions that may affect message traffic. However, network nodes that are outside of a carrier's network may not be aware of individual events within the carrier or of events associated with an individual user. Public networks typically interface with multiple carrier networks, content provider networks, individual company networks, and other nodes, which are often not aware of each other. Public networks also typically comprise a number of sub-networks that are generally operated independently, so that the overall public network will continue to operate if a subnetwork fails. Thus, public networks typically do not have any centralized control. Consequently, public network routing typically can not be adjusted in preparation for individual events.

Some intermediary message systems provide message routing services to multiple carrier networks. But these intermediary message systems typically have only a single channel, or a single type of channel to each carrier network. Moreover, current intermediary systems typically interface only with a gateway or network edge device of each carrier network. Similarly on the opposite end, current intermediary systems often interface only with a gateway or network edge device of an application program or service provider. Current intermediary systems may receive some information about a service provider's communication interface, or may receive some information about a destination user's mobile device. But current intermediary systems typically do not receive much, if any, information regarding the application programs of a content service, or information about individual destination users. In addition, current intermediary systems generally can not forecast and pre-arrange for routing based on individual events that may affect one user, affect a subset of users on different carriers, affect one network, or affect multiple networks. Such events may include personal calendar events, network maintenance schedules, or special events that my result in a surge or trough of traffic. It is with respect to these considerations and others that the current invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1A:
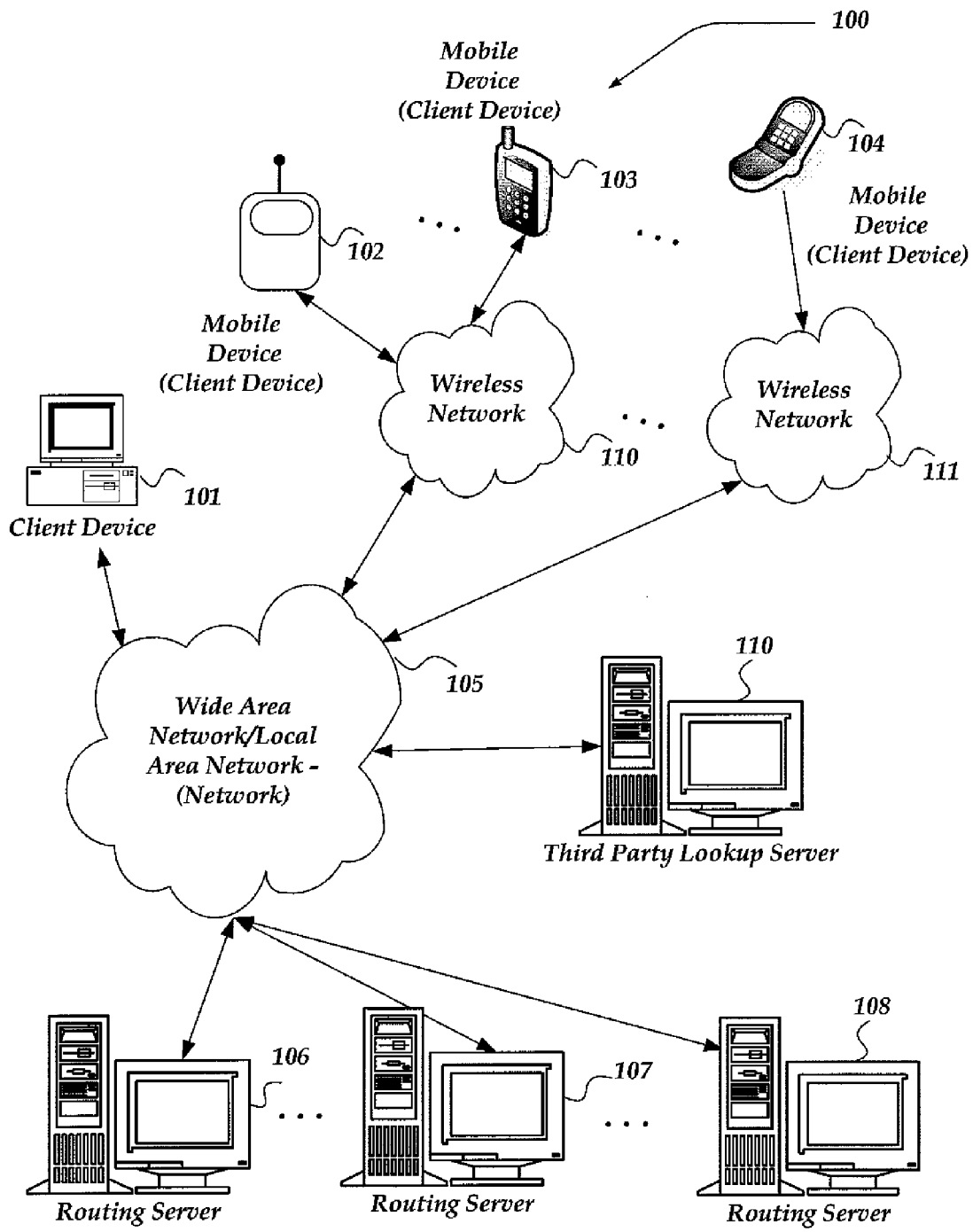
FIGS. 1A-1C are system diagrams of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "transceiving" refers to transmitting (sending) and/or receiving. As used herein, the term "application interface" refers to any component for transceiving information directed to an application, such as an online email application, a search application, a content provider application, or the like. In one embodiment, an application interface may be an Internet Protocol (IP) Application Programming Interface (API), a web service, a function callback, a remote procedure call, or the like.

The term Short Message Service (SMS) refers to a communication mechanism for providing connectionless transfers of limited size messages between networked devices. SMS messages may be cell broadcast services which are periodically delivered by short message to a pre-defined set of computing devices in a given area, or point-to-point services which include short messages sent to a specific user. The SMS protocol is described in more detail in International Standard ISO/IEC 21989, which is available through the International Standards Organization (ISO). As used herein, SMS refers to all such Short Message communications, and those derived therefrom.

As used herein, the terms "text messaging," or "text message" refer to SMS messaging, as well as a variety of other limited size message protocols, including, but not limited to Instant Messaging (IM), Multimedia Messaging Service (MMS) message, or an Enhanced Message Service (EMS) messaging protocols. Similarly, as used herein, the term "mobile message" refers to data configured to be displayed on a mobile device or to be sent from a mobile device. A mobile message (MM) may comprise a short message service (SMS) message, a Multimedia Messaging Service (MMS) message, or the like.

In addition, the terms "mobile originated," and "MO" refer to any communications that originates or is initiated from a mobile device, while the terms "mobile terminated," and "MT" refer to any communications that terminates at the mobile device. Thus, if an application, such as an email application, web service application, or the like, sends a message to a mobile device, such message is known as a MT type message. Similarly, a message sent by a mobile device to the application is known as a MO type message. Messages that are sent between two mobile devices are known as "mobile to mobile," or "MTM" communications.

The term "short code" refers generally to short strings of numbers or letters to which a message may be addressed and includes a common addressing scheme for participating wireless networks. Short codes are often shorter than telephone numbers or IP addresses, but may be longer. Examples of short codes might include, "92466," "445566," or the like. However, it is clear that short codes may also include alpha characters, or other symbols. Short codes may also include short code extensions, or simply "extensions. Such "extensions" may include virtually any alpha character, a numeric character, symbol, and/or any combination of alpha, numeric, and/or symbols. For example, typical short code extensions may employ a numeric range of numbers, such as from '000' to '100.' Short code extensions may also include non-contiguous sequences of numbers, or the like. Thus, in one embodiment, a network carrier may have allocated, for example, one sequence of short code extensions from 921-925, and another sequence, for example, from 891-910, or the like. It should be recognized that different network carriers may have different sequences of assigned short codes, extensions, ranges and/or sequences of short codes, or the like. Thus, the invention is not constrained to these short code examples, and other short codes, extensions, or the like, may also be employed. It is further recognized that in many articles, publications, or the like, the term short code may sometimes refer to both the short code itself and an extension. Therefore, as used herein, the term short code includes an extension, unless otherwise so indicated, without departing from the scope of the invention.

Short codes also provide a way to deploy interactive mobile data applications, including voting, polling, "text and win" contests, surveys, focus groups, direct marketing, live chats, games, and the like. At least two types of short codes may be used, including random short codes and vanity short codes. Random short codes include those numbers that may be randomly assigned, usually within at least some constraints. Vanity short codes are generally those selected based on a business requirement, such as for brand recognition, or the like. Short codes may be employed by different network carriers to indicate different applications, different services, or the like. Different network carriers may use a different number of short codes, be assigned non-contiguous blocks of short codes with extensions within a range of short codes with extensions, or the like. Many short codes may be assigned, and/or re-assigned for a given network carrier.

The term "service short code" refers to a short code that is assigned to an application, service, or the like. Service short codes may be assigned to different applications, services, or the like, for different network carriers. Moreover, multiple applications may share the same service short codes.

Briefly, the present invention is directed towards communicating mobile information over a network. In one embodiment, an application instructs an application interface to generate a MM, and transmit the MM to a routing server for delivery to a destination mobile device. In another embodiment, a client application running on an originating mobile device generates a MM, and transmits the MM to the routing server based on a short code associated with the routing service. The routing server determines a route for delivery to a destination network node, such as a destination mobile device. The MM includes a destination address, such as a destination phone number, mobile identification number, or the like. The MM may also include header information specifying routing instructions or preferences from the sender or from the destination user. The MM may further include advertising data, or other data in the corresponding message body. The routing server uses sender routing information, static carrier routing information, dynamic carrier routing information, or destination user routing information to determine a route to a destination carrier associated with the destination mobile device. The routing server uses a short code policy to obtain a short code for the determined destination carrier and selectively routes the MM to the destination carrier associated with the destination mobile device. This routing directly to the destination carrier is sometimes referred to herein as local processing. If the routing server determines that the MM should be routed to another routing server, the MM is recursively forwarded until the MM reaches another routing server associated with the destination mobile device. The other routing server is configured to selectively route the MM to the destination carrier. This routing indirectly to the destination carrier is sometimes referred to herein as remote processing. A response MM to the originally sent MM may be received at a boundary routing server. The response MM may be sent to the originating application interface if at least a portion of the response MM matches information associated the originally sent MM.

In one embodiment, the MM processing is within the context of Short Messaging Service (SMS) messages. However, the invention is not so limited, and the short codes, extensions, and/or service codes may also be employed within any of a variety of other text messaging protocols, emails, within HTML data, or the like, without departing from the scope of the invention.

Illustrative Operating Environment invention may be practiced. Not all the components may be required to practice the invention, and variations in the arrangement and type of the components may be made without departing from the spirit or scope of the invention. As shown, system 100 of FIG. 1A includes local area networks ("LANs")/wide area networks ("WANs")—(network) 105, wireless networks 110-111, Routing Server (RS) 106-108, third party lookup server 110, mobile devices (client devices) 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless networks 110-111, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, media content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an MSISDN, an electronic serial number (ESN), or other mobile device identifier. In one embodiment, the MSISDN may comprise a Country Code (CC), National Destination Code (NDC) which may identify at least one or part of a public land mobile network (PLMN), and a Subscriber Number (SN). The information may also indicate a content format that the mobile device is enabled to employ. Such information may be provided in a message, or the like, sent to RS 106-108, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as RS 106-108, client device 101, each other, or the like. However, the present invention is not limited to these message protocols, and virtually any other message protocol may be employed. For example, the client application may enable a user to interact with the browser application, email application, VoIP applications, or the like.

Mobile devices 102-104 may further be configured to include a client application that enables the end-user to log into an end-user account that may be managed by another computing device, such as RS 106-108. Such end-user account, for example, may be configured to enable the end-user to receive emails, send/receive IM messages, SMS messages, access selected web pages, or the like.

In addition, mobile devices 102-104 may include another application that is configured to enable the mobile user to share and/or receive media content, and to display the media content. In one embodiment, each of mobile devices 102-104 may share with and/or receive the media content from RS 106-108 and/or from another one of mobile devices 102-104. For example, media content may be shared between the mobile devices using MMS, WAP, or the like. In one embodiment, a mobile device may receive a message indicating the media content is available for viewing and/or annotating at a website, or the like.

In conjunction with sharing media content, mobile devices 102-104 may enable an interaction with each other, through sharing various messages, and generally participating in a variety of integrated social experiences beyond merely voice communications. Moreover, mobile devices 102-104 may enable transceiving a message through an application interface on one of RS 106-108, wherein RS 106-109 further routes a version of the message to a mobile device associated with a destination phone number. Mobile devices 102-104 may also communicate with non-mobile client devices, such as client device 101, or the like. In one embodiment, such communications may include providing information about the shared media to a user of client device 101, or the like.

Client device 101 may include virtually any computing device capable of communicating over a network to send and receive information. One embodiment of client device 101 is described in more detail below in conjunction with FIG. 2. Generally however, the set of such devices may include devices that typically connect using a wired or wireless communications medium such as personal computers, multiprocessor systems, microprocessor-based or programmable consumer electronics, network PCs, or the like. In one embodiment, client device 101 may be configured to access a website, or other location, of shared media content, and to annotate the media content, add additional media content, or the like. Similar to mobile devices 102-104, client device 101 may be configured to allow transceiving a message through an application interface on one of RS 106-108, wherein RS 106-109 further routes a version of the message to a mobile device associated with a destination phone number. For example, client device 101 may send a mail alert message to the application interface on one of RS 106-108. RS 106-108 may maintain a session associated with client 101 (e.g., with mail alert client program on client device 101). If a response message is received from the mobile device, RS 106-108 sends the response message to client 101 (e.g., the mail alert program).

Wireless networks 110-111 are configured to couple mobile devices 102-104 and its components with network 105. Wireless networks 110-111 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless networks 110-111 may further include an autonomous system of terminals, gateways, routers, and the like connected by wireless radio links, and the like. These connectors may be configured to move freely and randomly and organize themselves arbitrarily, such that the topology of wireless networks 110-111 may change rapidly. In one embodiment, at least a portion of wireless networks 110-111 comprises a Public Land Mobile Network (PLMN), a Public Telephone Switching Network (PTSN), Gateway Mobile Switching Centers (GMSCs), or the like.

Wireless networks 110-111 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless networks 110-111 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless networks 110-111 may include virtually any wireless communication mechanism by which information may travel between mobile devices 102-104 and another computing device, network, and the like. As shown wireless network 110 provides a communication mechanism for mobile device 102-103, and wireless network 110 provides a communication mechanism for mobile device 104.

Network 105 is configured to couple RS 106-108 and its components with other computing devices, including, mobile devices 102-104, client device 101, third party lookup server 110, and through wireless networks 110-111 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In one embodiment, network 105 may be configured to transport information over an Internet Protocol (IP). In essence, network 105 includes any communication method by which information may travel between RS 106-108, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Third party lookup server 110 includes any component for looking up a telephone carrier associated with a telephone number. In one embodiment, the telephone carrier may be a wireless carrier. In one embodiment, the telephone number may be a wireless number, including a number in an MSISDN format. Third party lookup server 110 may receive the telephone number over network 105 and may send a response carrier identifier over network 105 to, for example, one of RS 106-108. In one embodiment, third party lookup server 110 may be a NetNumber™ Transactional IP Telephony Addressing & Numbering (TITAN™) server, or the like.

One embodiment of RS 106-108 is described in more detail below in conjunction with FIG. 3. Briefly, however, RS 106-108 may include any computing device capable of connecting to network 105 to enable sending and receiving a message through an application interface configured to forward the message to a destination phone number. RS 106-108 may transcode the message into a mobile message (MM), route and/or forward the MM to an appropriate carrier associated with the destination phone number over network 105. In one embodiment, each of RS 106-108 may recursively forward the MM to a different RS until it is determined that the receiving RS is to process the MM. In one embodiment, RS 106-108 may be connected in a virtual ring. That is, one RS may send the message only to another RS, until the last RS in the ring connects to the originally sending RS. However, the invention is not so limited, and any configuration, including a fully connected configuration may be used.

In one embodiment, each of RS 106-108 may be associated with and/or otherwise may be in charge of a different subset of wireless networks. For example, RS 106 may be associated with wireless network 110, and RS 107 may be associated with wireless network 111, and so forth. In one embodiment, a local gateway, aggregator, Message Service Center (MSC) and/or carrier managed by a particular RS may be associated with a particular wireless network. For example, wireless network 110 may be an ATT™ wireless network managed by RS 106, and wireless network 110 may be a Sprint™ wireless network managed by RS 106 and/or RS 107. In on embodiment, each RS may manage a plurality of wireless networks. For example, RS 106 may manage wireless networks 110-111, while the other RSs may manage other pluralities of wireless networks.

In one embodiment, a timeout may be used to determine an error state. For example, if the MM has been forwarded through RS 106-108 past a period of time, the MM may no longer be forwarded. Other error-checking mechanisms, such as detecting that the MM has not been processed by an RS, may also be used without departing from the scope of the invention. In one embodiment, RS 106-108 may employ a process similar to that described below in conjunction with FIGS. 4-6 to perform at least some of its actions. Devices that may operate as RS 106-108 include personal computers, desktop computers, multiprocessor systems, microprocessor-based or programmable consumer electronics, network PCs, servers, and the like.

Although FIG. 1A illustrates each of RS 106-108 as a single computing device, the invention is not so limited. For example, one or more functions of each of RS 106-108 may be distributed across one or more distinct computing devices. For example, sharing of media content, managing Instant Messaging (IM) sessions, SMS messages, email messages, transceiving of media content, may be performed by a plurality of computing devices, without departing from the scope or spirit of the present invention.

Figure 1B:
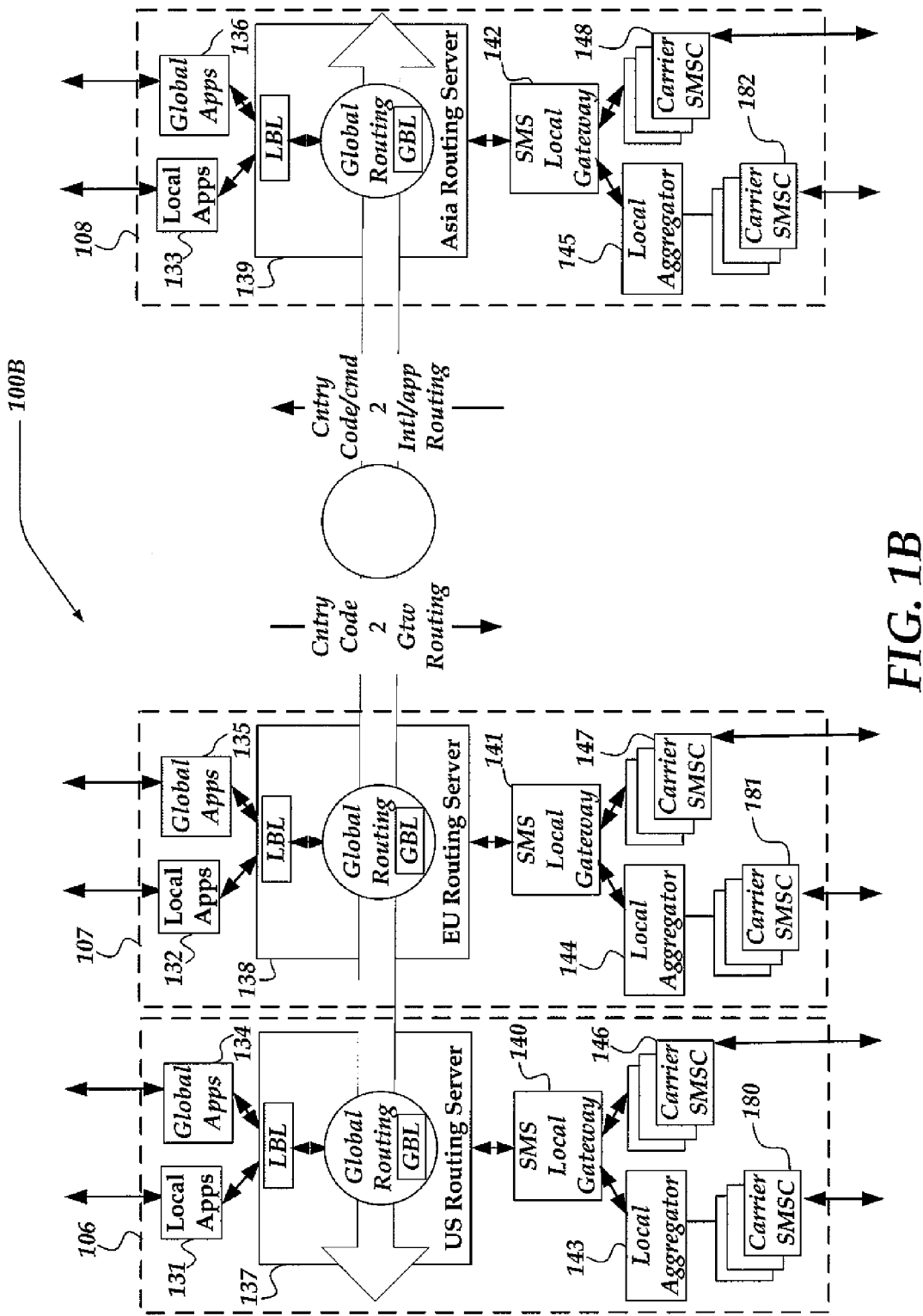

FIG. 1B shows components of an alternate embodiment of an environment in which the invention may be practiced. System 100B may include many more or less components than those shown in FIG. 1B. System 100B includes RS 106-108. RS 106-108 is in communication with each other in a ring configuration, wherein RS 106 is in communication with RS 107, RS 107 is in communication with RS 108, and RS 108 is in communication with RS 106. As shown, each of RS 106-108 comprises substantially similar components that perform substantially similar functions.

Each of RS 106-108 includes local applications 131-133, global applications 134-136, business and routing logic modules (BRLM) 137-139, SMS gateways 140-142, local aggregators 143-145, carrier Short Message Service Centers (SMSCs) 146-148, and carrier SMSCs 180-182. Local application 131 and global application 134 are in communication with BRLM 137. BRLM 137 is in communication with SMS local gateway 140. SMS local gateway 140 is in communication with local aggregator 143 and carrier SMSC 146, and local aggregator 143 is in communication with carrier SMSC 180. Although SMS local gateway 140 is shown as a single component, there may be a plurality of local gateways. In one embodiment, there may be a local gateway for each country and/or state located within a geographic region associated with the RS. Each of RS 107-108 also includes components communicating similarly to the components of RS 106. Also, while an SMS and SMSC are shown, other messaging services such as a Multimedia Message Service (MMS) and a Multimedia Message Service Center (MMSC) may be used without departing from the scope of the invention. In one embodiment, components of RS 106-108 perform the operations of processes 400-600 of FIGS. 4-6.

Briefly, local application 131 may receive a message from an application running on RS 106 over an IP protocol, an OSI application level protocol, or the like. Similarly, global application 134 may receive a message from a remote application over a network (e.g., an email application, a web service, or the like). The message is sent to BRLM 137. The message may be received at an interface. The interface may convert the message into a mobile message (MM). In one embodiment, BRLM 137 may determine if the MM is to be locally or remotely processed. If the MM is to be remotely processed, the MM is forwarded to RS 107 and/or RS 108 until the MM reaches an RS configured to process the MM. If the MM is to be locally processed, a destination carrier for the MM is determined. It may also be determined whether to send the MM to the local aggregator 143 or directly to a carrier SMSC 146. BRLM 137 determines a specific routing path based on pre-defined and/or tracked information, including destination user information, carrier static information, carrier gateway dynamic information, and weighting factors on the various information. The MM is selectively routed appropriately based on this determination and sent to the destination carrier. The destination carrier then sends the MM to a mobile device (e.g., one of mobile devices 101-104).

Figure 1C:
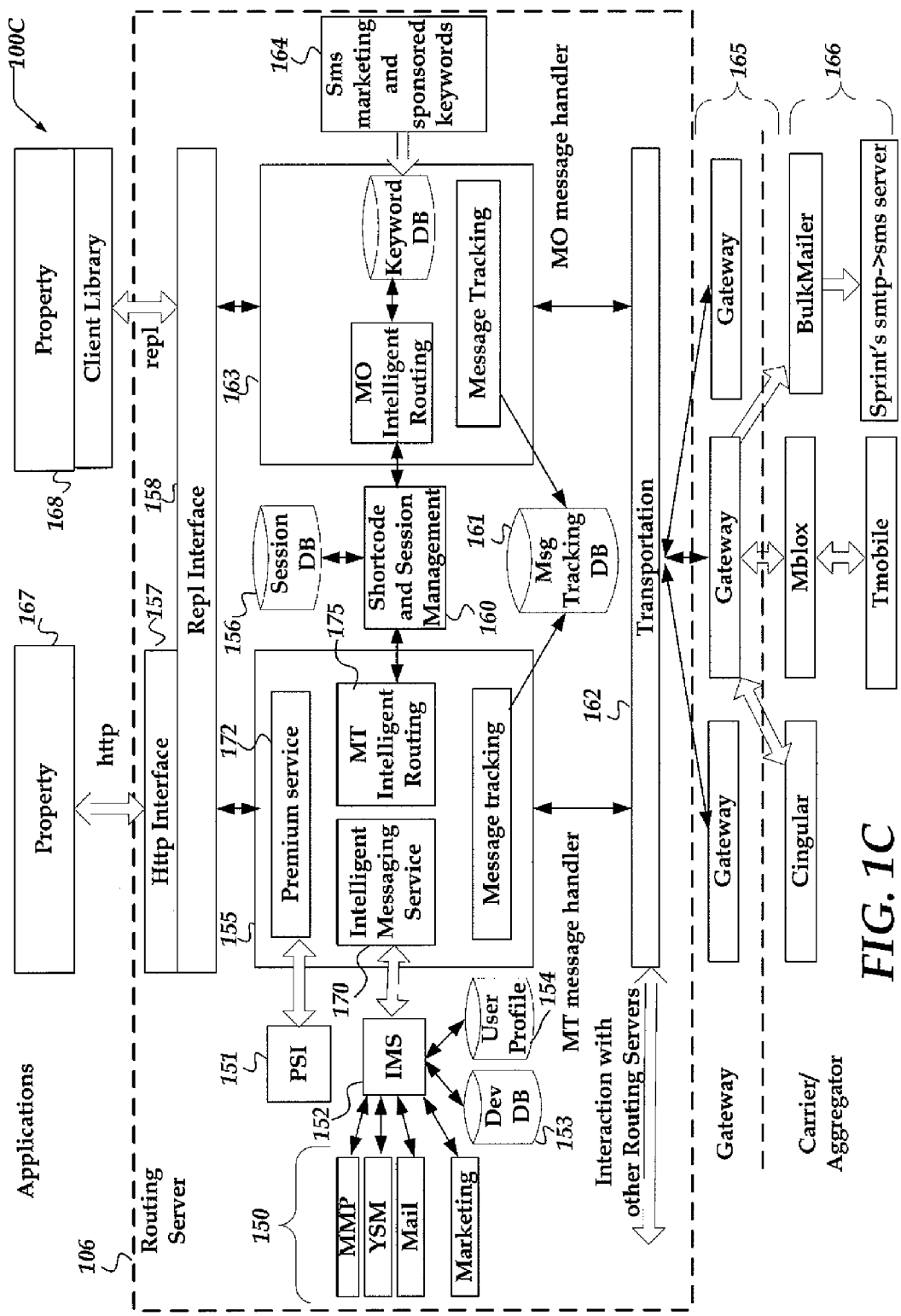

FIG. 1C shows components of an alternate embodiment of an environment in which the invention may be practiced. System 100C may include many more or less components than those shown in FIG. 1C. In one embodiment, components of system 100C perform the operations of processes 400-600 of FIGS. 4-6.

System 100C includes RS 106, properties 167-168, gateways 165, and carrier and/or aggregator components 166. Property 168 includes a client library (e.g., application program). RS 106 includes HTTP interface 157, replication interface 158, local applications 150, PSI 151, MS 152, development database 153, user profile database 154, intelligent messaging component 155 (sometimes referred to herein as an MT message handler), session database 156, short-code and session management component 160, intelligent routing component 163 (sometimes referred to herein as an MO message handler), SMS marketing and sponsored keywords storage 164, message tracking database 161, and transportation layer 162.

HTTP interface 157 is in communication with property 167 (global application). Replication interface 158 is in communication with property 168 (global application). Local applications 150 (MMP, YSM, Mail, Marketing) are in communication with the application interfaces, PSI 151 and MS 152. These application interfaces are in communication with development database 153 and user profile database 154. HTTP interface 157, replication interface 158, PSI 151 and MS 152 are in communication with intelligent messaging component 155. HTTP interface 157 and replication interface 158 are also in communication with intelligent routing component 163. Intelligent messaging component 155 is in communication with short-code and session management component 160, which is in communication with session database 156, and with intelligent routing component 163. Both intelligent messaging component 155 and intelligent routing component 163 are in communication with message tracking database 161 and with transportation layer 162. SMS marketing and sponsored keywords storage 164 is in communication with intelligent routing component 163. Transportation layer 162 is in communication with other routing servers (e.g., over an IP network) and gateways 165. Gateways 165 are in communication with carrier and/or aggregator components 166.

Briefly, a message is received by a local application (e.g., PSI 151 and/or MS 152) and/or a global application (e.g., properties 167-168). The message is converted into an MM by an interface (e.g., HTTP interface 157 and/or replication interface 158). Intelligent messaging component 155 evaluates the MM to determine whether the MM will be processed locally for delivery to a coupled carrier, or whether the MM will be routed to a remote routing server for delivery to a remote carrier (such as in another country). The MM may include a foreign phone number or other indication that the MM is intended for delivery to a remote carrier. In that case, intelligent messaging component 155 routes the message to a remote RS for processing.

If the MM is to be processed locally, intelligent messaging component 155 may customize the MM and determines a route for delivering the MM to the carrier of the destination device. Before, during, or after the routing is determined, intelligent messaging component 155 may customize the content, encoding, or other aspects of the MM with an intelligent messaging service 170. For example, intelligent messaging service 170 may insert a WAP link into the MM body for an advertisement, for a link to additional information, or for other purpose. Intelligent messaging service 170 may insert advertising text, a banner, or other content. To determine the inserted content, intelligent messaging service 170 may use information about the destination user's recent activities, such as recent purchases, recent WAP sites visited, recent other users contacted, or the like. For instance, the intelligent messaging service may determine that the destination user recently purchased a ring tone from an online music service, and may insert an advertisement for another ring tone. Intelligent messaging service 170 may also determine which content must be eliminated and truncate the message body to fit within message limits. For example, intelligent messaging service 170 may truncate the MM to 160 characters for a GSM system, or to 70 characters for a Unicode system. The intelligent messaging service may further customize the MM to support different encoding for various standards, including the protocol of the determined route.

Intelligent messaging component 155 includes a criteria component, which accesses or determines destination user criteria, message sender criteria, and/or carrier criteria for routing messages. For example, a premium service component 172, determines whether the MM should be routed with priority or other premium handling, based on a premium service level for the destination user and/or for the destination carrier. Similarly, intelligent messaging component 155 includes an MT intelligent routing component 175, which accesses information that can be used for routing the MM, such as the destination user's preferred route, history or analysis of prior message routes to the destination user's device, individual scheduling, presence, information about the destination user's online behaviors tracked with the destination user's consent, or other user profile information. The MT intelligent routing component 175 also accesses information regarding carriers, scheduled or predicted conditions for carriers or routes, application-related data, advertising, or other information that may be used to determine or prioritize routing. As needed, the MT intelligent routing component 175 accesses the destination carrier gateway for real-time traffic conditions, obtains aggregated statistical data regarding traffic, or other dynamic information. The various static and dynamic information is weighted and evaluated as described in more detail below, and a route is selected to the destination carrier.

The MM accesses short-code and session management component 160 to obtain a short-code for the destination carrier. The MM also provides a short-code identifying RS 106, so that a reply will be returned to the routing server for delivery to the originally sending application or original sender. In one embodiment, at least a portion of a sender phone number of the MM may be a short-code and/or extension (e.g, 9999 (short-code) and 001 (extension)). The portion may be stored using short-code and session management component 160 and/or session database 156. Intelligent messaging component 155 sends the MM, and may store the message in message tracking database 161 and/or store a session mapping using short-code and session management 160 and/or session database 156.

If the MM is to be routed to a remote RS, the MM is sent to intelligent routing component 163, which includes an MO intelligent routing, a keyword database, and a message tracking component. The intelligent routing component 163 may determine that the routed MM may include a sponsored keyword, or the like, using sponsored keywords storage 164 and may store an indication of a use of the keyword in message tracking database 161 for further monetization, or the like. Intelligent routing component 163 may then recursively route the MM to another RS using transportation component 162. The other RS may operate substantially similarly to RS 106.

If the MM is to be processed locally, the MM is sent using transportation component 162 to one of gateways 165 for further processing. As shown, carrier and/or aggregator components 166 include a plurality of carriers, including Cingular™, T-Mobile™, and Sprint™. Components 166 may also aggregate messages before sending them, such as with a bulk mailer, mailbox, or the like. In one embodiment, each of gateways 165 may be associated with a country or state, and each of gateways 165 may communicate with its own set of components 166. In one embodiment, the MM is sent from at least one of gateways 165 to the appropriate one of components 164 associated with a destination phone number of the MM.

Illustrative Client Environment

Figure 2:
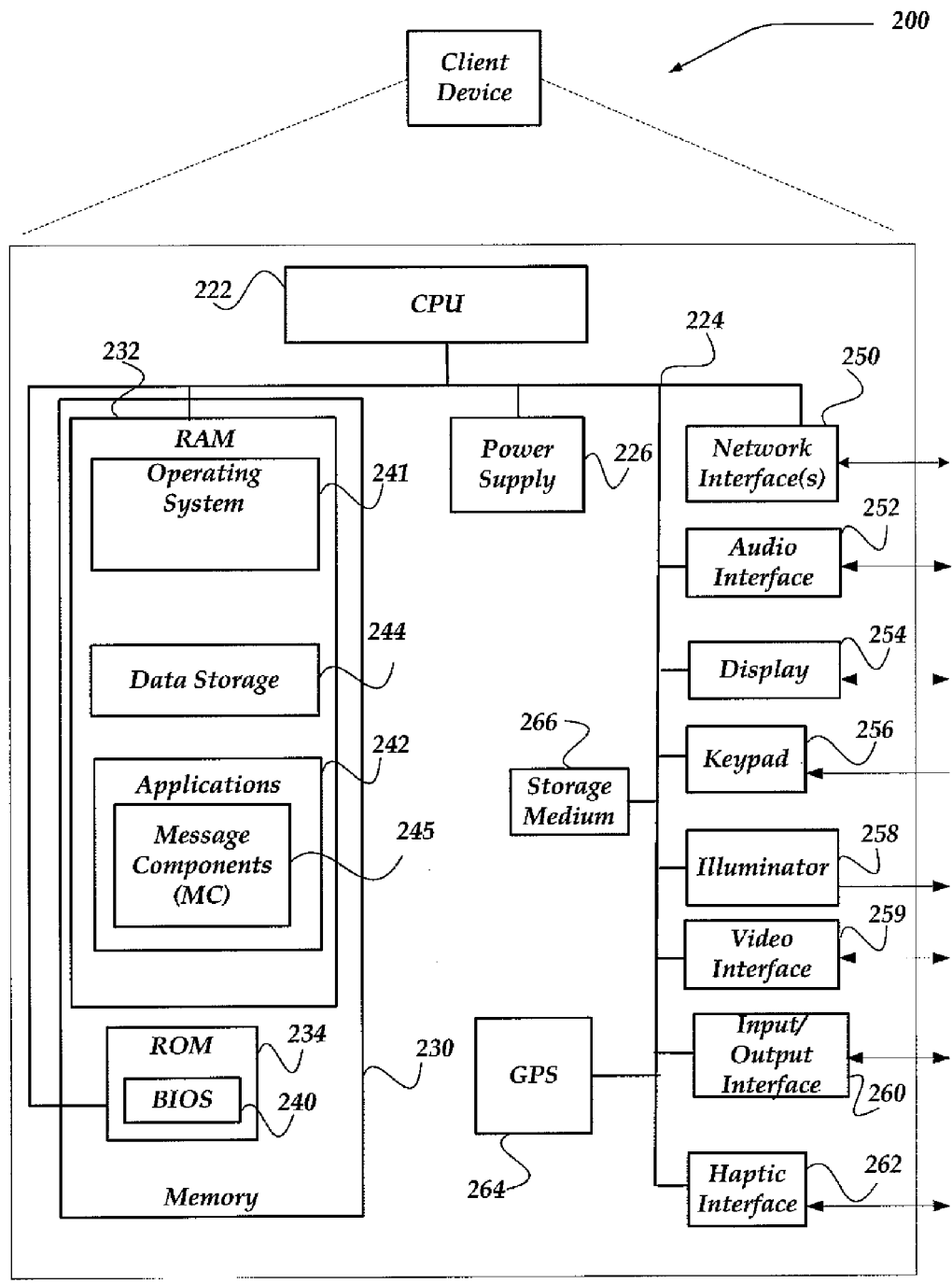
FIG. 2 shows one embodiment of a mobile device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, mobile devices 102-104 of FIG. 1A.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning system (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of mobile device 200. The information may then be provided to another device, including being sent as part of a header during a communication, sent upon request, or the like. Moreover, data storage 244 may also be employed to store media content and/or social networking information including text messages, address books, group member lists, or the like. At least a portion of the media content may also be stored on storage medium 266, such as a disk drive, removable storage, or the like within mobile device 200.

Applications 242 may include computer executable instructions which, when executed by mobile device 200, provide such functions as calendars, contact managers, task managers, transcoders, database programs, word processing programs, screen savers, security applications, spreadsheet programs, games, search programs, and so forth. Applications 242 may further include Message Components (MC) 245.

MC 245 represents any of a variety of applications configured to transmit, receive, and/or otherwise process messages and other network content, including, but not limited to SMS, MMS, IM, email, VOIP, browsers, or the like, and to enable telecommunication with another user of another networked device. For example, MC 245 may include any of a variety of browser applications, which may be run under control of operating system 241 to enable and manage requesting, receiving, and rendering markup pages such as WAP pages (sometimes referred to as WAP cards), SMGL, HTML, HDML, WML, WMLScript, JavaScript, and the like.

MC 245 may further include an IM application that is configured to initiate and otherwise manage an instant messaging session, including, but not limited to AOL Instant Messenger, Yahoo! Messenger, .NET Messenger Server, ICQ, and the like. In one embodiment, the IM application within MC 245 may be configured to employ a SIP/RTP to integrate IM/VOIP features. For example, the IM application may employ SIMPLE (SIP for Instant Messaging and Presence Leverage), APEX (Application Exchange), Prim (Presence and Instant Messaging Protocol), Open XML-based XMPP (Extensible Messaging and Presence Protocol), more commonly known as Jabber and OMA (Open Mobile Alliance)'s IMPS (Instant Messaging and Presence Service) created specifically for mobile devices, or the like.

MC 245 may also include text messaging application(s) that enables client device 200 to receive and/or send text messages to another device. In one embodiment, the text messaging application(s) may also provide an alerting mechanism that indicates to a user of client device 200 when a text message is received. The text messaging application(s) may also allow the user to compose a text response message, and to send the text response message over a network. The text messaging application(s) may operate to manage SMS text messages, MMS messages, Enhanced Message Service (EMS) messages, or the like, where graphics, video clips, sound files, or other media content may be communicated between client device 200 and another networked device.

In any event, any one or more of the messaging applications within MC 245 may be employed to enable a user of client device 200 to communicate with an Internet Protocol (IP) enabled application interface over network interfaces 250. In one embodiment, MC 245 and/or a type of message generated by MC 245 may be associated with the (IP enabled) application interface. In one embodiment, the application interface may be a web interface, an email interface, or the like.

Illustrative Server Environment

Figure 3:
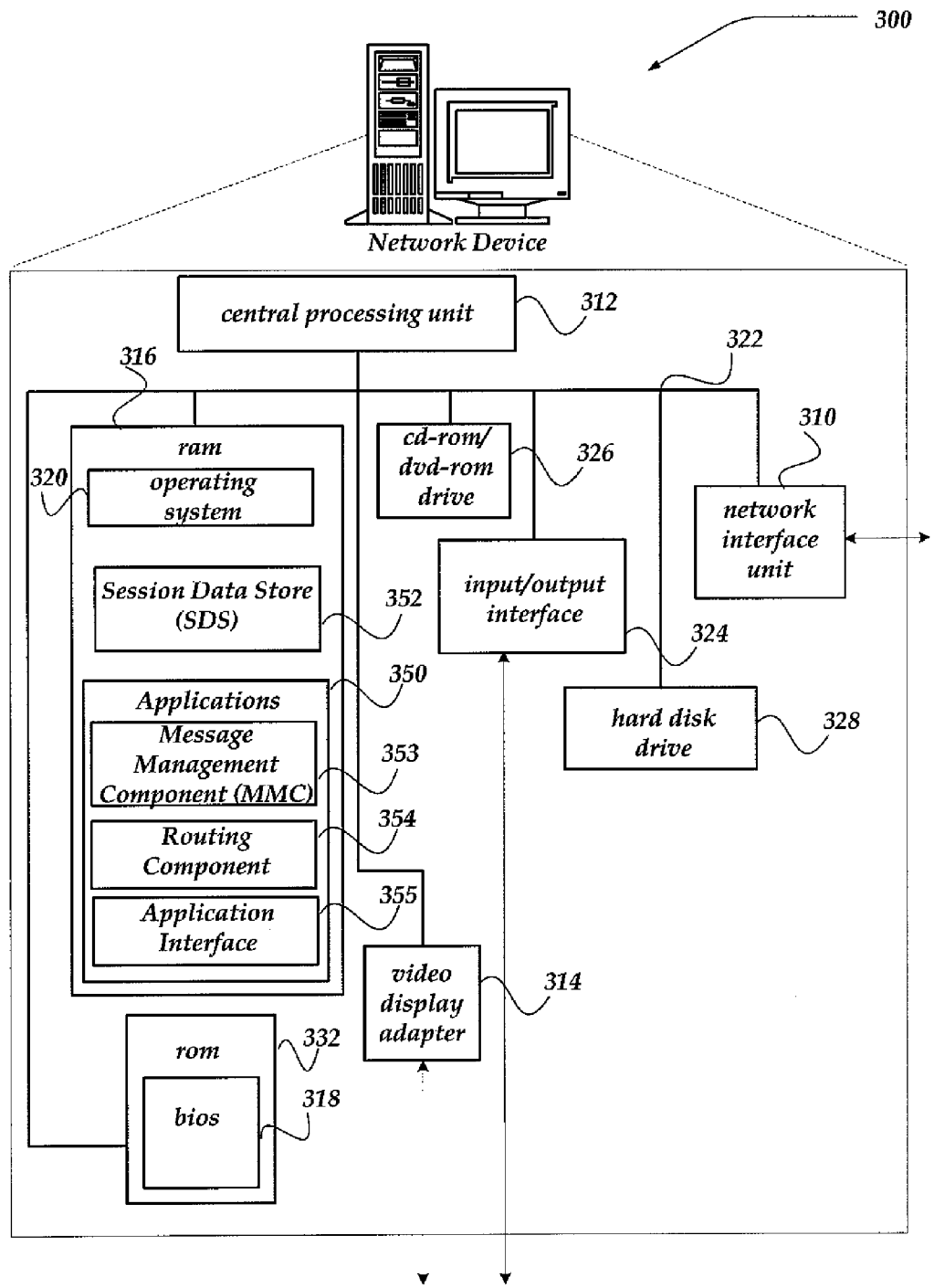
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, RS 106-108 of FIGS. 1A-1C.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs (including XmlHTTPRequest (XHR), Asynchronous JavaScript and XML (AJAX), or JavaScript Object Notation (JSON) programs), customizable user interface programs, IPSec applications, encryption programs, security programs, account management, and so forth.

Session Data Store (SDS) 352 includes any component for storing a plurality of associations between at least a portion of a source phone number, a destination phone number, an identity of a routing server and/or an application identifier or type associated with application interface 355. In one embodiment, the associations may be session mappings. The session mappings may map at least a short-code and/or extension number with the application interface 355.

Application interface 355 includes any component for transceiving a message. In one embodiment, application interface 355 may transmit a message from a local application, such as an email application, a global application, such as through a web service interface (e.g., AJAX interface), over network interface 310, or the like. Application interface 355 may transcode the message to and/or from a mobile message type (e.g., into an MM). In one embodiment, application interface 355 may also receive an MM. The MM may be in response to another MM previously sent through application interface 355. The received MM may be transcoded and sent to an application for further processing. For example, the received MM may be a request for an email in response to an email alert MM.

Message management component 353 includes any component for transceiving an MM from application interface 355. Message management component 353 may perform operation of any one or more of processes 400-700 of FIGS. 4-7. For example, message management component 353 may determine to process the MM locally. If the MM is to be processed locally, message management component 353 may create a session mapping using SDS 352 and determine a route to the destination carrier. The MM may further send the MM to a local aggregator and/or the destination carrier through a Message Service Center (MSC), over network interface unit 310. A routing component 354 may also be used to determine a local or external route. If the MM is to be processed globally, the MM is sent by routing component 354 to another routing server.

Routing component 354 may include any component for recursively routing an MM over network interface unit 310, to another routing server. In one embodiment, the other routing server operates substantially similarly to network device 300. In one embodiment, routing component 354 may determine a destination carrier based on information cached in RAM 316 and/or hard disk 328 and/or information received from a third party lookup service over network interface 310. Routing component 354 may perform operation of one or more of processes 400-700 of FIGS. 4-7. For example, routing component 354 may determine the appropriate routing server to process the MM based on a mapping of a country code portion of the MM and the appropriate routing server.

Generalized Operation

The operation of certain aspects of the invention will now be described with respect to FIGS. 4-7B. FIGS. 4-7B provide logical flow diagrams of certain aspects of the present invention. The processes of FIGS. 4-7B may be implemented, for example, within RS 106-108 of FIG. 1A, and/or components of FIGS. 1B-1C.

Figure 4:
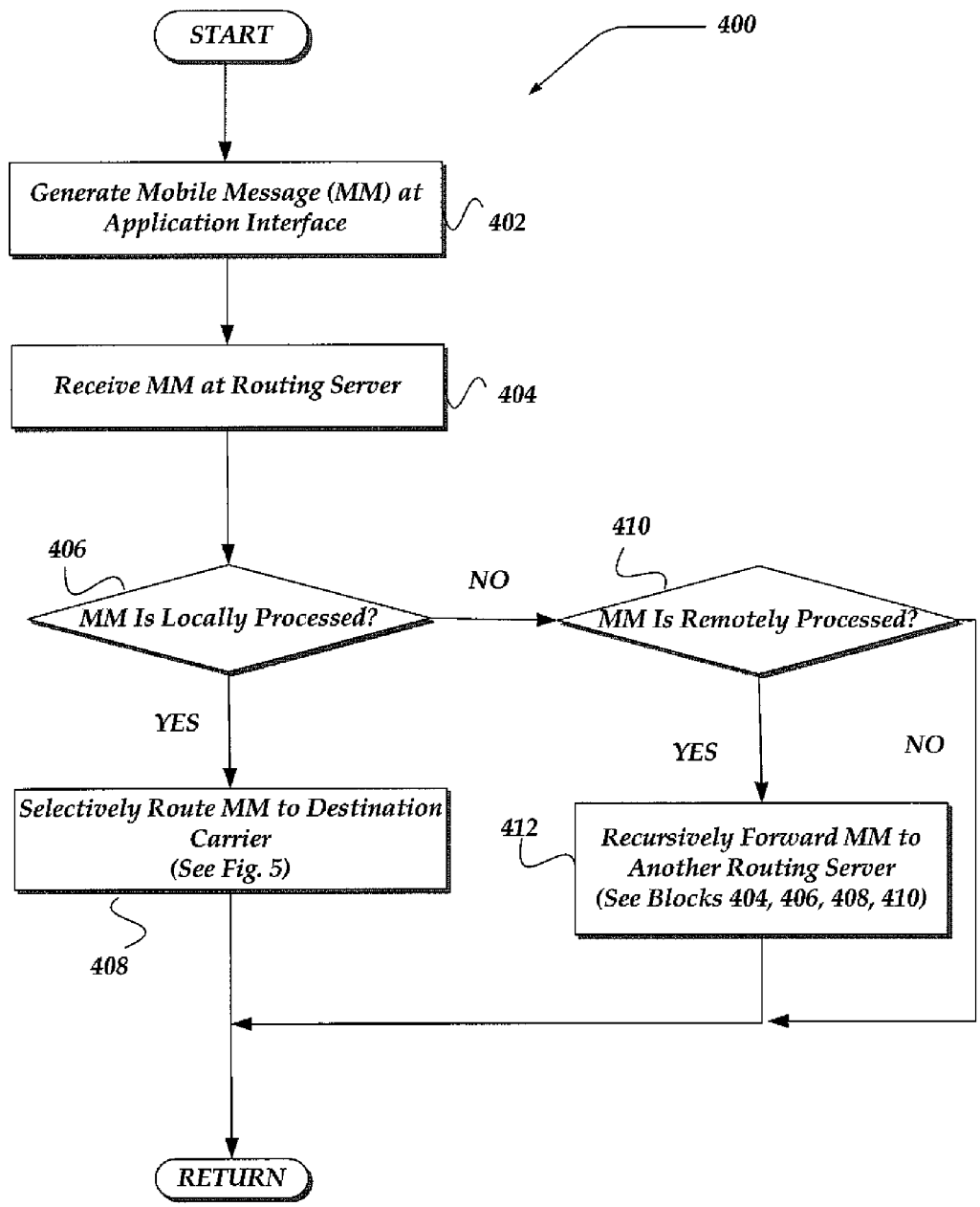
FIG. 4 illustrates a logical flow diagram generally showing one embodiment of a process for sending a mobile message over an application interface.

FIG. 4 illustrates a logical flow diagram generally showing one embodiment of a process for sending a mobile message over an application interface. Process 400 begins at block 402 where a mobile message (MM) may be generated by the application interface. In one embodiment, the application interface is configured to receive information over Hyper Text Transfer Protocol (HTTP) (e.g., using a web services component), a Simple Mail Transfer Protocol (SMTP), or any other Open Systems Interconnection (OSI) application level protocol. In one embodiment, the MM comprises a Short Message Service (SMS) message, a Multimedia Message Service (MMS) message, or the like. The application interface may transcode the received information between a type associated with an application and a mobile message (MM) type. The received information may be received over a network, from a client device, a client application (program), or the like. In one embodiment, the network may be configured to process an Internet Protocol (IP). The client device and/or client program may be associated with the application interface, connected to the application interface via a session, or the like.

The MM may be generated based on the received information. In one embodiment, the MM includes a message body and/or advertising information. For example, the advertising information may be appended to the MM if a difference between a threshold and a length of a message body of the MM is sufficient to add the advertising information. Likewise, the length of the advertising information may be determined based upon the length of the message body. For example, if the threshold is 160 characters and the message body is 100 characters, 60 characters of advertising information may be included. However, if the threshold is 160 characters but the message body is 145 characters, 15 characters of advertising information maybe included. In one embodiment, the threshold is based upon a defined maximum length for a SMS message. This length may be defined, for example, by the carrier or by a geographical region associated with the client device. The defined length may be different for each carrier and/or geographical region.

In one embodiment, the advertising information includes both a selectable resource identifier and an advertisement descriptor. However, in other embodiments, a selectable resource identifier may be provided without an advertisement descriptor, an advertisement descriptor may be provided without a selectable resource identifier, and/or the like.

The advertisement descriptor may be any content that is an advertisement, describes an advertisement, is a slogan, is a phrase, and/or the like. The advertisement descriptor may also be based upon the content of the message body and may be obtained from a specialized data source or from an individual data source. Likewise, the advertisement descriptor may also be based on a user's current location, a current application running on the mobile device, the mobile device profile data, online profile data that is associated with the mobile device, for preferences, behaviors, past purchases, social networking relationships, and/or other user-specific data. Other examples of information upon which the generation of the advertisement descriptor ay be based include:

- tracked behavior of a user (e.g. purchase history, number of searches)
- user-specific data (e.g. demographic data such as gender)
- time of day at the time of query
- time zone of the user
- search query characteristics (e.g. language, length of query, media type)
- data plan of the device or user
- device capabilities or characteristics (e.g. screen size)
- user expressed preferences
- proximity (e.g. to other devices or other users)
- direction of the device (e.g. device is facing north)
- movement of the device (e.g. device is going north, device is moving at 10 mph)
- tracked behavior or other context of users related to user initiating search;
- social network (e.g. user A's friends search for sports, so sports are more relevant for user A)
- network characteristics (e.g. speed)
- content owned by the user or on a device used by the user, which can be, but does not have to be the same as the mobile device (e.g. user has a document on their PC relevant to a search done on the mobile device).

Similarly, the server may employ aggregated data from click stream analyses and/or other statistical analyses to generate the advertisement descriptor.

The selectable resource identifier may be included to enable the user to respond to and/or interact with the advertisement descriptor. For example, the selectable resource identifier may include a short-code, a telephone number, an IP address, a Uniform Resource Locator (URL), a shortened-URL that encodes a full URL, a user identifier, or the like.

Processing then continues to block 404.

At block 404, the MM is received at a routing server located within a geographic region. In one embodiment, the MM is received over the network. In one embodiment, the geographic region of the routing server may be determined (e.g., predefined, by GPS, by an IP address of the routing server, or the like). The MM may comprise a destination phone number, sender phone number, message body, or the like. In one embodiment, the routing server may be configured to include advertising information into the MM. In one embodiment, the phone number may be in an MSISDN format. The MM may be configured to be displayed on the mobile device. Processing then continues to decision block 406.

At decision block 406, it is determined whether the MM is to be locally processed in the geographic region. In one embodiment, the determination comprises determining if the MM can be delivered through a local gateway. In one embodiment, the destination phone number is parsed for a country code. In one embodiment, the destination phone number may be an MSISDN. In one embodiment, the country code may be the Country Code (CC) and/or National Destination Code (NDC) portion of the MSISDN. In one embodiment, if the country code is included in a plurality of country codes associated with the routing server and/or the geographic region associated with the routing server, the MM is to be locally processed. If the MM is to be locally processed in the geographic region, processing continues to block 408. Otherwise, processing continues to decision block 410.

At block 408, the routing server selectively routes the MM to a destination carrier associated with the destination phone number. Selective routing may be performed by process 500 of FIG. 5. Processing then returns to a calling process for further processing.

At decision block 410, it is determined whether the MM is to be remotely processed. In one embodiment, the determination comprises determining if the MM can be delivered through another (remote) gateway. In one embodiment, the destination phone number is parsed for a country code. In one embodiment, if it is determined that the country code is included in a plurality of country codes associated with the other routing server and/or the other geographic region associated with the other routing server, then the MM is to be remotely processed. If the MM is to be remotely processed, processing continues to block 412. Otherwise, processing returns to a calling process for further processing.

At decision block 412, the MM is recursively forwarded over the network until the MM reaches another routing server geographically located within another region associated with the destination phone number. In one embodiment, the other routing server may be configured to include advertising information into the MM. In one embodiment, recursive forwarding comprises performing blocks 404, 406, 408, and 410 for each of routing servers to which the MM is forwarded. Processing then continues to a calling process for further processing.

Figure 5:
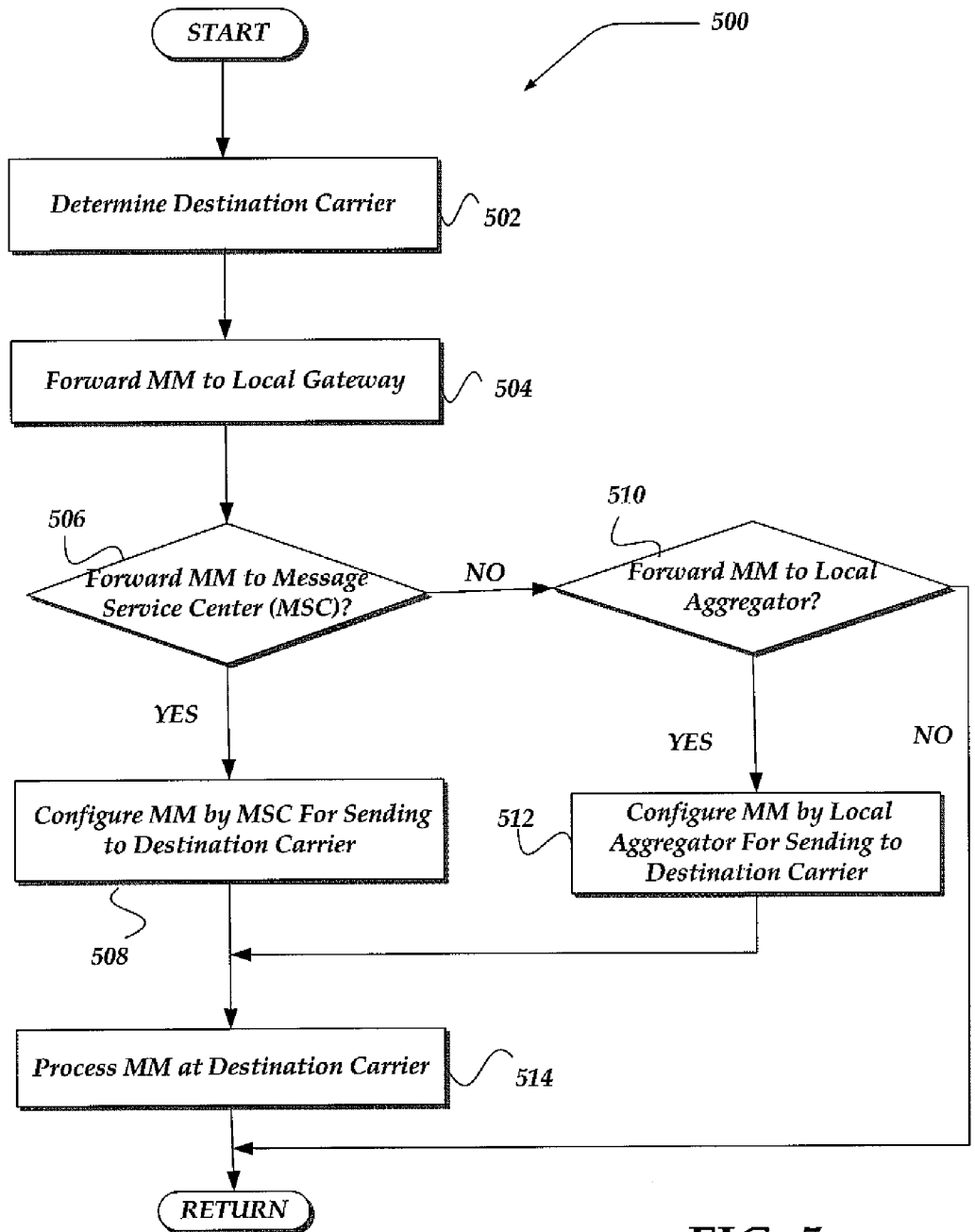
FIG. 5 illustrates a logical flow diagram generally showing one embodiment of a process for selectively routing a mobile message.

FIG. 5 illustrates a logical flow diagram generally showing one embodiment of a process for selectively routing a mobile message. Process 500 begins at block 502, where a destination carrier is determined. In one embodiment, the destination carrier may be determined based on a cached association relating the destination carrier and the destination phone number. In one embodiment, the destination carrier is determined based on a Subscriber Number (SN) portion of the destination phone number. If the association is not cached, the association is received from a third-party lookup server. The received association may be cached for later retrieval. Processing then continues to block 504.

At block 504, the MM is forwarded to a local gateway associated with a country code portion of the destination phone number. In one embodiment, the local gateway may be located in geographic proximity to a country associated with the country code portion. In one embodiment, the identity of the carrier may also be forwarded to the local gateway. In one embodiment, block 502 may be optional and may not be performed. Processing then continues to block 506.

At decision block 506, it is determined whether to forward the MM to a Message Service Center (MSC). In one embodiment, this determination is performed by a local gateway and/or sent to the local gateway. In one embodiment, if a Quality of Service (QoS) within a time-window of a network connection between the routing server and the MSC is above a threshold, processing continues to block 508. For example, if an inverse of a congestion measure (e.g., number of dropped SMS messages) of the network connection is above a threshold, processing continues to block 508. Otherwise, processing continues to decision block 510.

At block 508, the MM is forwarded to the MSC and configured by the MSC for sending to the destination carrier. In one embodiment, the MM is converted/transcoded from an MM type to another MM type associated with the destination carrier, before being sent to the MSC. In one embodiment, the MM types comprise at least one of a Simple Network Paging Protocol (SNPP), a Computer Application interface to Message Distribution (CIMD) protocol, or the like. In one embodiment, the MSC is configured to directly connect to the destination carrier. In one embodiment, the determined destination carrier may be associated with the MSC. In one embodiment, the MSC comprises a Short Message Service Center (SMSC), a Multimedia Message Service Center (MMSC), or the like. Processing then continues to block 514.

At decision block 510, it is determined whether to forward the MM to a local aggregator. In one embodiment, if the QoS is not above the threshold, processing continues to block 512.

At block 512, the MM is routed to a local aggregator and configured by the local aggregator for sending to the destination carrier. In one embodiment, the MM is converted/transcoded from an MM type to another MM type associated with the destination carrier, before being sent to the local aggregator. In another embodiment, the local aggregator may perform the conversion/transcoding. In one embodiment, the local aggregator is configured to forward the MM to a plurality of carriers. In one embodiment, the determined destination carrier may be received by the local aggregator. The local aggregator may then forward the MM to the destination carrier. Processing then continues to block 514.

At block 514, the destination carrier receives the MM and processes the MM. In one embodiment, the destination may receive the MM over a Public Land Mobile Network (PLMN) or Public Telephone Switching Network (PTSN) via Gateway Mobile Switching Centers (GMSCs), or other non-IP enabled network, or the like. The destination carrier may send the MM to the mobile device. Processing then continues to a calling process for further processing.

Figure 6:
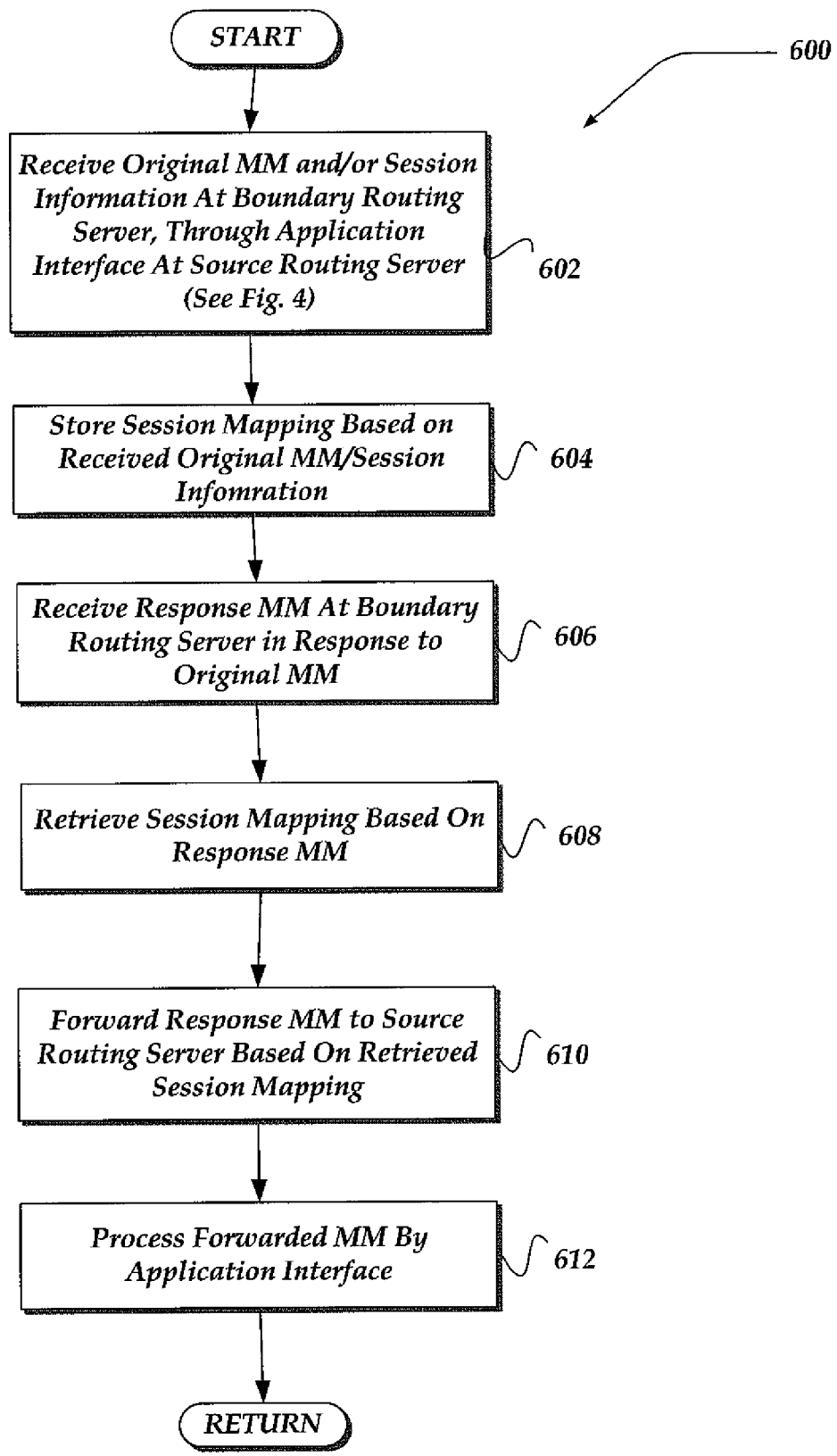
FIG. 6 illustrates a logical flow diagram generally showing one embodiment of a process for receiving a mobile message over an application interface, in accordance with the present invention.

FIG. 6 illustrates a logical flow diagram generally showing one embodiment of a process for receiving a mobile message over an application interface. Process 600 of FIG. 6 begins at block 602 where a mobile message and/or session information are received at a boundary routing server and through an application interface at a source routing server. In one embodiment, the session information may be included within the MM. Block 602 may be performed by process 400 of FIG. 4. Briefly, the MM/session information is received over an application interface at the source routing server, and the source routing server either locally processes the MM/session information or recursively forwards the MM/session information to another routing server for substantially similar processing. The routing server sending the MM to a carrier (either the source routing server of the other routing server) will be referred herein as the boundary routing server. Processing then continues to block 604.

At block 604, a session mapping is stored, wherein the session mapping may be between at least any two or more of at least a portion of a sender phone number included within the originally received MM, the session information, a unique identifier associated with the MM, the source routing server, and the application interface. In one embodiment, the unique identifier may be a long code (e.g., a short code and an extension). In one embodiment, the received session information may include an identifier of the source routing server, and application identifier and/or type for an application sending and/or expecting a response for the MM, an identifier of the application interface, or the like. In one embodiment, the received session information may include the extension and/or the sender phone number may be or include the short code. In one embodiment, the session mapping may be stored at boundary routing server determined to process the originally received MM. In one embodiment, the session mapping may include the identifier of the boundary and/or source routing server, at least a portion of a sender phone number of the original MM, at least a portion of the destination phone number of the original MM, an application identifier associated with the application interface, the unique identifier, or the like. In one embodiment, the MM may be modified to include the unique identifier. For example, the sender phone number of the MM may be modified to be the short code and/or extension. Processing continues to block 606.

At block 606, a response MM in response to the originally received MM is received. In one embodiment, the receiving may be performed at the boundary routing server. In one embodiment, the response MM is received at a local gateway, an MSC, or the like associated with the boundary routing server storing the session mapping, or the like. In one embodiment, the response MM is addressed to the sender phone number of the originally received MM. In one embodiment, the sender phone number comprises a short-code and an extension, or the like. In one embodiment, the response MM is addressed to and/or includes the unique identifier (e.g., long code) of the originally received MM. Processing then continues to block 608.

At block 608, the session mapping is retrieved based on the response MM. In one embodiment, the retrieval may be performed at the boundary routing server. In one embodiment, the retrieval may be based on a match of at least a portion of the MM and a key/identifier for the session mapping, another sender phone number of the response MM with the at least a portion of the destination phone number of the originally received MM, a match of at least a portion of another destination phone number of the response MM with the at least the portion of the sender phone number of the originally received MM, or the like. In one embodiment, the session mapping may be identified/keyed by the unique identifier (e.g., long code). The long code may be the receiver address of the response MM and/or included within the response MM. Retrieval may be based on matching the unique identifier and the long code associated with the response MM. The retrieval may be based on a lookup table, database query, or the like. Processing then continues to block 609.

At block 610, the response MM is forwarded to a mapped routing server based on the session mapping. In one embodiment, the mapped routing server is the source routing server receiving the original MM. In one embodiment, the mapped routing server is configured to send the response MM to the application interface based on the session mapping/session information (e.g., based on the application identifier or application type stored in the retrieved session mapping and/or session information). In one embodiment the mapped routing server may be the routing server stored in the session mapping. Processing continues to block 612.

At block 612, the application interface may process the forwarded response MM. In one embodiment, the application interface may transcode the MM to an application type (e.g., an email, web page, or the like). The transcoded version of the MM may be sent to an application associated with the application type and/or application interface. Processing then returns to calling process for further processing.

Figure 7A:
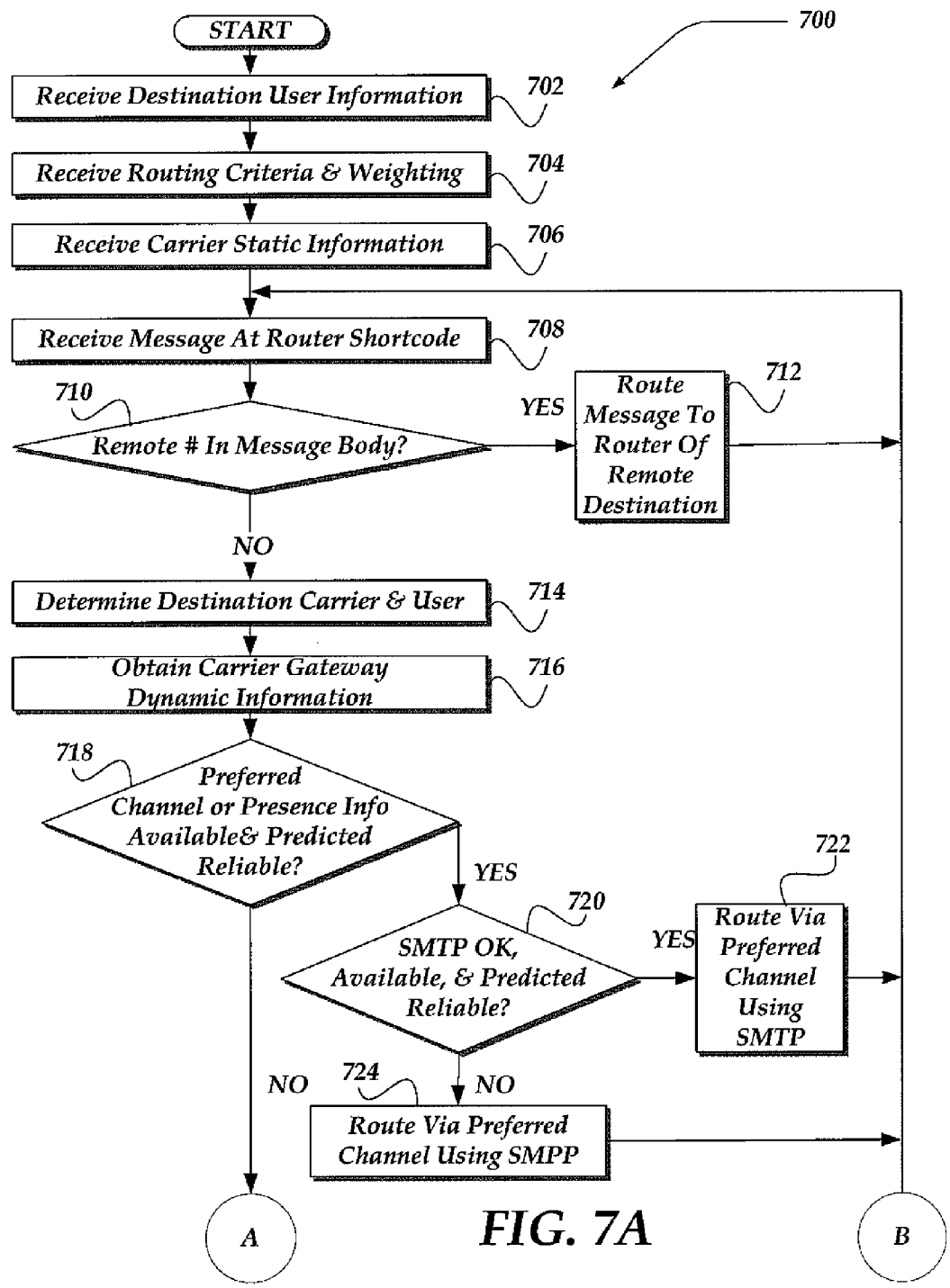
FIG. 7A-7B illustrate a logic flow diagram generally showing one embodiment of a process for determining a route to send a message.
Figure 7B:
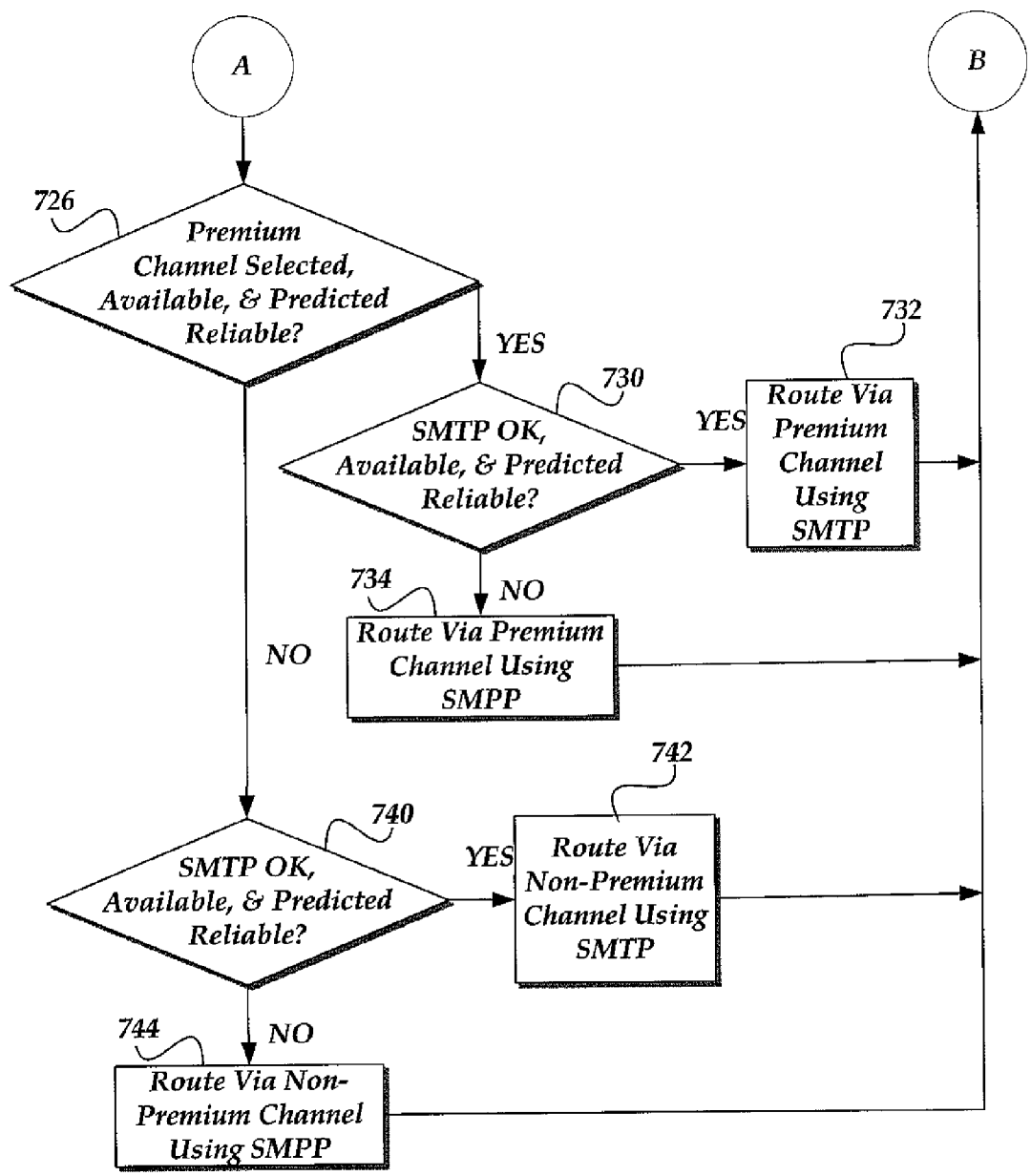

FIGS. 7A-7B illustrate a logic flow diagram generally showing one embodiment of a process for determining a route to send a message. Generally during a preliminary phase, at a block 702, a routing server receives information about one or more destination users. In one embodiment, a destination user refers to a user of a mobile device, but may be any other user. An MM may be directed to a destination user. An MM may also be received from a destination user, such as a reply from the destination user. Thus, the destination user may be referred to as a replier or a sender. Destination user information may come from a mobile device user, from an online service with which the destination user is registered or interacts, or from another source. For example, a mobile device user may interact with an online service, which tracks and records the interactions associated with the mobile device. The association may be made with an identifier of the mobile device, such as a phone number. In addition, or alternatively, the association may be made with a registered user identifier that is also associated with the mobile device. In that case, destination user information may include information about the registered user's interactions through other devices, in addition to interactions through the registered user's mobile device. Interactions may include prior messaging activity with one or more destination carriers, prior use of an application, prior geographic locations of the user's mobile device, prior purchases, prior searches, prior social networking interactions, or the like. The destination user information may be updated periodically, or whenever a change occurs. For instance, the destination user may enter a meeting, birthday reminder, or the like into the user's calendar, causing an update to the destination user information.

In any case, destination user information may include delivery routing preferences, an indication of premium service registration, cost limitations, alternate delivery destinations, such as a pager, a general purpose computer address, or the like. Destination user information may also include data regarding personal events, such as reminders of birthdays, anniversaries, meetings, or the like. Those skilled in the art will recognize that a destination user may also include a client application program, a server application, or any other application. Accordingly, destination user information may comprise delivery routing preferences, application event information, or other information similar to information for destination users. Such information for an application program may sometimes be referred to as destination application information.

Also generally during a preliminary phase, at a block 704, the routing server receives routing criteria and weighting information. This information is generally provided by an administrator, who may select parameters and corresponding weights for the routing server to use in determining a route. Differing weights may be applied to a set of parameters, such as a premium service indicator, a user preference parameter, a user presence parameter, a user preferred route parameter, one or more carrier route parameters, or the like. During operation, the routing server may evaluate each selected weighted parameter, and determine whether a threshold is exceeded for each selected weighted parameter, to make a decision for each selected weighted parameter. Alternatively, the routing server may evaluate all of the selected weighted parameters, and determine a route based on a resulting score. To simplify the description, the following example embodiment illustrates decisions for each selected parameter. Those skilled in the art with recognize that other parameters may be selected and included in the logic.

During the preliminary phase, the routing server also generally receives or accesses carrier static information from each carrier, or about each carrier, at a block 706. Carrier static information includes a range of short codes to be used for routing messages to a carrier, cost information for each available channel to the carrier, delivery priority information for each available channel to the carrier, schedule information associated with the carrier or certain coverage areas of the carriers, and the like. Carrier static information, may be based on contractual relationships between each operator of a routing server and each carrier. Carrier static information may also comprise historical or statistical data provided by, or determined about each carrier route. For example, some or all carriers may periodically provide reports or statistical data about the routes to those carriers. Alternatively, or in addition, the routing server may store historical traffic data associated with each route to each carrier. The routing server may analyze historical or real-time traffic data to determine and store traffic patterns for predicting likely traffic problems, route availability, route reliability, or the like. The routing server may access this stored or pre-analyzed carrier static information prior to, or during an operational phase to help determine a best route.

During an operational phase, the routing server receives a message, at a block 708. The message may be from an application program or from a mobile device. The message is generally directed to the routing server that is addressed by a short code. The routing server evaluates the message header and message body to determine a destination address and routing information that may be provided by the sender. At a decision block 710, the routing server determines whether the message includes a remote destination address, such as a country code or an area code of a phone number in the message body to a different geographic region, a short code extension indicating that the message is to be handled by a separate particular routing server, or the like. If the routing server finds a remote destination address, the routing server routes the message to, or toward, another router that that will process the message, at a block 712. Control then returns to block 708 to await another message.

If the routing server determines that it is the proper router to route the message to a carrier, the routing server uses the destination address in the message to determine the destination carrier, at a block 714. For example, the routing server may determine the carrier from a destination phone number in the message, and obtain a corresponding short code for that carrier. The routing server also obtains carrier static information associated with the determined carrier. The routing server may also perform some preliminary, or additional analysis of the carrier static information for the determined carrier. For example, the routing server may access or determine scheduling information, historical traffic data, route reliability information, or other data for routes to the determined carrier.

Similarly, the routing server also determines a destination user from the phone or other destination address in the message. For instance, a user may have registered with an online portal or other service that operates the routing server. The destination user may have provided the destination user's phone number, messaging ID, or other identifier. Alternatively, the routing server or online service may store a profile or other information based on a device identifier, such as the destination phone number, mobile identification number, or the like. The routing server uses the destination address to determine the user or the destination device. If the routing server determines a user or destination device, the routing server obtains corresponding profile information, such as the destination user's routing preference, individual event information, tracked behavior information, and the other destination user information discussed above.

At a block 716, the routing server also obtains carrier gateway dynamic information. The routing server contacts the gateway of the destination carrier, and obtains current traffic conditions, current queue backlog, current costs, and/or other real-time information. The carrier gateway dynamic information may also include short term or long term statistical information, such as average wait time in carrier queues before delivery processing, average delivery time on the current day of the week, or the like. If the carrier provides multiple channels, the routing server obtains current dynamic information for each channel. The routing server evaluates the current dynamic information, the carrier static information, the destination user information, or other data relative to the routing criteria to determine a route. An example evaluation is described below with some of the routing criteria. Additional or alternate routing criteria may be used to determine a route.

At a decision block 718, the routing server determines whether the destination user information indicates a preferred route to the destination carrier. For example, the destination user may be at a certain company that uses a particular gateway with the carrier, or uses a dedicated short message service center (SMSC) with the carrier. The destination user may prefer that the message be routed through a preferred channel, such as a particular T1 line or other preferred communication means.

The destination user information may also include presence information, user schedule information, or other individual user information. For example, the destination user information may include user schedule information stored with an online service that is associated and indicating that the destination user is on a flight, so that the user would not likely be able to receive the message right away. In that case, the routing server may access the online service based on the destination user identifier (e.g., user ID, phone number, short code, etc.), and determine that the user's preferred route may not be needed, especially if the preferred route is costly. The presence information may indicate that messages should be routed to an email system rather than through the SMS system. Conversely, the destination user's schedule may indicate that the destination user will be entering a meeting soon, so a higher priority route may be given higher weight, or immediately selected, rather than a preferred low-cost route. In another embodiment, the destination user information may include a history or statistical analysis of prior routes used for this particular destination user. This historical or statistical information may indicate a preferred route, or a prioritization of preferred routes, that are not necessarily pre-selected by the destination user. These determined preferred routes may be determined from those that are most often used, those that the user individually selects most often, those that are based on the type of messages received by the destination user, or the like. Based on this historical or analyzed data, a "preferred" route can be forecast or predicted. The predicted route can be given a higher weight, or identified as the destination user's preferred route.

In addition, or alternatively, the routing server may determine whether the carrier static information indicates a preferred route specified by the carrier. Further, the message may indicate a route preferred by the sender. Each preference may be weighted to make a final determination of which preferred route should be used.

The preferred route may also be overridden based on current carrier gateway dynamic information or predicted information. For example, current carrier gateway dynamic information may indicate that the user's preferred route is not be available, or is excessively loaded. Alternatively, the carrier static information may indicate that the destination carrier is scheduled for maintenance shortly, or that excessive traffic is likely soon, due to an event that is specific to the carrier. For instance, if the carrier static information indicates that a preferred SMS channel of the detected carrier is scheduled to be down for maintenance at a certain time of the day, the routing server may be configured to send fewer messages, or no messages over that preferred SMS channel during a period before the scheduled maintenance.

In addition, or alternatively, the current, historical, or statistical traffic data may indicate that the preferred route is not currently sufficiently available or sufficiently reliable. For example, the routing server may analyze the traffic data to determine whether the preferred route is not predicted to be sufficiently available or reliable at this time of the day, this day of the week, this day of the month, this day of the year, with a given size of message, to a particular destination user, or for other reasons. For instance, the routing server may determine that the average queue time for the preferred channel around the current time of day is five seconds, whereas the average queue time for a non-preferred channel around the current time of day is only two seconds. In that case, the routing server may give more weight to the non-preferred route. Similarly, analysis of historical traffic data and schedule data may indicate that heavy message traffic occurs over the preferred route between 9:00 am and 11:00 am on each day on which a particular sports game is played in a certain city (e.g. Saturday morning before a college football game). In that case, the routing server may try to determine a channel that has the smallest average queue time.

If the routing server determines that the message should be routed through the preferred route, the routing server determines which message transfer protocol to use through the preferred route, at a decision block 720. Similar to evaluating the preferred route, the routing server checks whether the simple mail transfer protocol (SMTP) can be used, is available for use, and/or is predicted to be reliable at that time. SMTP may be preferred for cost reasons. If SMTP is available and predicted to be reliable, the routing server may give a higher weight to using SMTP. If SMTP is chosen, the routing server transmits the message via the preferred route using SMTP, at a block 722. If SMTP is can not be used, is not available, or is not predicted to be reliable, the routing server transmits the message via the preferred route using short message peer-to-peer protocol (SMTP), at a block 724. Control then returns to block 708 to await another message.

If the routing server determines that a preferred route is not available or presence information is not available, or should not be used, the routing server determines whether a premium service is selected, available, or predicted to by available/reliable, at a decision block 726 of FIG. 7B. The destination user may have registered for, and paid for premium delivery or other premium services through a reserved, or limited traffic route. In addition, or alternatively, the sender (or operator of the sending application) may have contracted with the operator of the routing server for premium delivery. Each premium service indication may be weighted to make a final determination of which premium service takes precedence. A certain route may be associated with each premium service. Similar to determining whether to use a preferred route, the premium service route may also be overridden, or weighted lower, based on current carrier gateway dynamic information, user payment status, predicted availability, predicted reliability, or other information.

If the routing server determines to use the premium service (e.g., that premium service is available and predicted to be reliable), the routing server determines which message transfer protocol to use through the route associated with the premium service. At a decision block 730, the routing server checks whether SMTP can be used, is available for use, and/or is predicted to be reliable at that time. If SMTP is available and predicted to be reliable, the routing server may give a higher weight to using SMTP. If SMTP is chosen, the routing server transmits the message via the premium route using SMTP, at a block 732. If SMTP is can not be used, is not available, or is not predicted to be reliable, the routing server transmits the message via the premium route using SMTP, at a block 734. Control then returns to block 708 to await another message.

If the routing server determines that a premium route has not been selected, is not available, or should not be used, the routing server may filter the routing based other criteria. Other criteria may comprise the destination user's current schedule, purchase patterns, geographic movement patterns, current location, use of wireless hotspots, or the like. Based on any one or more of these criteria, the routing server may forecast or predicted a route. The routing server may give each predicted route a weight, and evaluated all weighted routes to make a final decision. Alternatively, the routing server may select a routed in hierarchical decision-tree manner, or other decision process.

When filtering criteria are exhausted, the routing server chooses a default channel. This may be a channel selected by low priority, by a round-robin process, or other default process. The routing server determines which message transfer protocol to use through the default route. Similar to the protocol decisions discussed above, at a decision block 740, the routing server checks whether SMTP can be used, is available for use, and/or is predicted to be reliable at that time. If SMTP is available and predicted to be reliable, the routing server may give a higher weight to using SMTP. If SMTP is chosen, the routing server transmits the message via the default (e.g., non-premium) route using SMTP, at a block 742. If SMTP is can not be used, is not available, or is not predicted to be reliable, the routing server transmits the message via the default route using SMTP, at a block 744. Control then returns to block 708 to await another message.

A reply message can be routed to a sending mobile device, or to a third party application, in a similar manner. A reply message to an application that is closely associated with the routing server, may be routed via a local network with a different, or no route determination.

It will be understood that each block of a flowchart illustration need not be limited in the ordering shown in the illustration, and might be performed in any ordering, or even performed concurrently, without departing from the spirit of the invention. It will also be understood that each block of the flowchart illustration, and combinations of blocks in the flowchart illustration, can be implemented by computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent is:

1. A method for determining a route to send a message over an electronic network, comprising:

receiving a message that identifies a destination identifier, wherein a body of the message is limited to a predefined size, and wherein the message is a mobile phone message;

determining one of a plurality of separate carriers to which to route the message based on the destination identifier, if the destination identifier further indicates a local carrier that currently provides messaging services to a destination device associated with the destination identifier;

accessing predefined carrier routing information that indicates availability of each of a plurality of channels that correspond to the one determined carrier of the plurality of other separate carriers;

accessing destination user information that is associated with the destination identifier and a destination user, wherein the destination user information indicates availability of the destination user to receive messages, and includes a destination user criterion for determining one of the plurality of channels through which to send the message to the determined carrier for routing to the destination device;

accessing real-time carrier gateway dynamic information that indicates current and statistical traffic information for each of the plurality of channels to the determined carrier; and selecting one of the plurality of channels based on the predefined carrier information, the destination user information, and the carrier gateway dynamic information, wherein the availability of each of the plurality of channels is based on:

predefined schedule data provided from the determined carrier;

prior traffic data for each of the plurality of channels to the determined carrier a first weighting factor applied to the predefined schedule data; and a second weighting factor applied to the prior traffic data.

2. The method of claim 1, wherein the message is received from a remote routing server which determined that the destination identifier indicates a carrier that is not currently associated with the destination identifier to provide messaging services to a destination device identified by the destination identifier.

3. The method of claim 1, wherein the message is received from an application interface for managing communication with an application program available through a network.

4. The method of claim 1, wherein the message is received from a client device and is addressed to a short code, wherein a body of the message includes the destination identifier, identifying the destination device for the message.

5. The method of claim 1, wherein the destination user criterion comprises a destination user schedule, indicating when the destination user is available to receive the message.

6. The method of claim 1, further comprising inserting content into the message based on an online behavior of the destination user.

7. The method of claim 1, wherein the predefined carrier routing information comprises statistically determined availability of each of the plurality of channels, based on routing of prior messages to the determined carrier via each of the plurality of channels.

8. The method of claim 1, wherein selecting one of the plurality of channels comprises predicting the availability of each of the plurality of channels based on routing of prior messages to the determined carrier via each of the plurality of channels.

9. The method of claim 1, wherein the message comprises a short message service message and the destination identifier identifies a mobile device.

10. A non-transitory computer readable medium storing computer readable instructions for causing an electronic device to perform the method of claim 1.

11. A server for determining a route to send a message over an electronic network, comprising:
 a processor;
 a communication interface in communication with the processor, in communication with at least one electronic network, and in communication with a message source; and
 a memory in communication with the processor and storing processor readable instructions that cause the processor to perform a plurality of operations, including:

receiving from the message source, a message that identifies a destination identifier, wherein a body of the message is limited to a predefined size, and wherein the message is a mobile phone message;

determining one of a plurality of separate carriers to which to route the message based on the destination identifier, if the destination identifier further indicates a local carrier that currently provides messaging services to a destination device associated with the destination identifier;

accessing predefined carrier routing information that indicates availability of each of a plurality of channels that correspond to the one determined carrier of the plurality of other separate carriers;

accessing destination user information that is associated with the destination identifier and a destination user, wherein the destination user information indicates availability of the destination user to receive messages, and includes a destination user criterion for determining one of the plurality of channels through which to send the message to the determined carrier for routing to the destination device;

accessing real-time carrier gateway dynamic information that indicates current and statistical traffic information for each of the plurality of channels to the determined carrier; and selecting one of the plurality of channels based on the predefined carrier information, the destination user information, and the carrier gateway dynamic information, wherein the availability of each of the plurality of channels to the determined carrier is based on predefined schedule data provided from the determined carrier and is based on prior traffic data for each of the plurality of channels to the determined carrier.

12. The server of claim 11, wherein the message source determined that the destination identifier indicates a carrier that is not currently associated with the destination identifier to provide messaging services to a destination device identified by the destination identifier.

13. The server of claim 11, wherein the message source is an application interface for managing communication with an application program available through a network.

14. The server of claim 11, wherein the message source is a client device and the received message is addressed to a short code, wherein a body of the received message includes the destination identifier, identifying the destination device.

15. The server of claim 11, wherein the destination user criterion comprises a destination user schedule, indicating when the destination user is available to receive the message.

16. The server of claim 11, wherein the processor readable instructions further cause the processor to perform the operation of predicting the availability of each of the plurality of channels based on routing of prior messages to the determined carrier via each of the plurality of channels.

17. A system for determining a route to send a message over an electronic network, comprising:
 an intelligent messaging service that determines:
  predefined carrier routing information that indicates availability of each of a plurality of channels that correspond to one of a plurality of separate carriers; and
  destination user information that is associated with a destination identifier and a destination user, wherein the destination user information indicates availability of the destination user to receive messages, and includes a destination user criterion for determining one of the plurality of channels through which to send a message to the carrier for routing to a destination device; and an intelligent routing module in communication with the intelligent messaging service and that performs a plurality of operations, including:
- receiving the message that identifies the destination identifier, wherein a body of the message is limited to a predefined size, and wherein the message is a mobile phone message;
- determining one of the plurality of separate carriers to which to route the message based on the destination identifier, if the destination identifier further indicates a local carrier that currently provides messaging services to a destination device associated with the destination identifier;
- accessing the predefined carrier routing information;
- accessing the destination user information;
- accessing real-time carrier gateway dynamic information that indicates current and statistical traffic information for each of the plurality of channels to the determined carrier; and
- selecting one of the plurality of channels based on the predefined carrier information, the destination user information, and the carrier gateway dynamic information, wherein the intelligent routing module includes one or more processors, wherein the availability of each of the plurality of channels is based on:
- predefined schedule data provided from the determined carrier;
- prior traffic data for each of the plurality of channels to the determined carrier a first weighting factor applied to the predefined schedule data; and
- a second weighting factor applied to the prior traffic data.

18. The system of claim 17, further comprising a criteria component in communication with the intelligent routing module and that determines whether the destination user information is to include a premium service criterion indicating a particular one of the plurality of channels.

* * * * *